United States Patent
Mendoza et al.

(10) Patent No.: US 12,434,818 B2
(45) Date of Patent: Oct. 7, 2025

(54) TANDEM SPLIT DIVERGENT WINGLET

(71) Applicant: Textron Aviation Inc., Wichita, KS (US)

(72) Inventors: Gonzalo Eduardo Mendoza, Wichita, KS (US); Corey Wailes Hagemeister, Wichita, KS (US); Kelly Ray Laflin, Andover, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/337,130

(22) Filed: Jun. 19, 2023

(65) Prior Publication Data

US 2023/0406484 A1    Dec. 21, 2023

Related U.S. Application Data

(60) Provisional application No. 63/353,260, filed on Jun. 17, 2022.

(51) Int. Cl.
*B64C 23/06*    (2006.01)

(52) U.S. Cl.
CPC ................................. *B64C 23/069* (2017.05)

(58) Field of Classification Search
CPC ...... B64C 23/069; B64D 47/02; B64D 47/04; B64D 47/06
See application file for complete search history.

(56) References Cited

U.S. PATENT DOCUMENTS

| | | | | |
|---|---|---|---|---|
| 2,375,075 | A * | 5/1945 | Carruth | B64D 47/06 |
| | | | | 244/129.1 |
| 2,571,158 | A * | 10/1951 | Orlansky | B64D 47/06 |
| | | | | 362/470 |
| 2,843,728 | A * | 7/1958 | Roth | B60Q 1/2611 |
| | | | | 340/981 |
| 2,881,307 | A * | 4/1959 | Adler, Jr. | B64D 47/06 |
| | | | | 340/981 |

(Continued)

FOREIGN PATENT DOCUMENTS

| GB | 2553524 A * | 3/2018 | ........... B64C 23/065 |
|---|---|---|---|
| WO | 2020146399 A1 | 7/2020 | |

OTHER PUBLICATIONS

Bill Carey, Aviation Partners Boeing Signs Customers for Winglet Mod, Aug. 12, 2013, 2 pages.

(Continued)

*Primary Examiner* — William L Gmoser
(74) *Attorney, Agent, or Firm* — Avek IP, LLC

(57) ABSTRACT

A tandem split divergent winglet for an aircraft includes a forward sail extending from an outboard end of a wing of the aircraft having a cant angle in a first direction, and an aft sail extending partially from the forward sail and partially from the outboard end of the wing. The aft sail has a cant angle in a second direction opposite the first direction. For aircraft having a low wing, the forward sail includes an upwards cant angle and the aft sail includes a downwards cant angle. For aircraft having a high wing, the forward sail includes a downwards cant angle, and the aft sail includes an upwards cant angle. Light emitted from an integrated light formed within the aft sail is blocked from reaching a cockpit window of the aircraft by the forward sail.

9 Claims, 16 Drawing Sheets

(56) References Cited

U.S. PATENT DOCUMENTS

| | | | |
|---|---|---|---|
| 3,102,993 A * | 9/1963 | Jensen | B64D 47/06 340/981 |
| 4,722,499 A | 2/1988 | Klug | |
| 5,275,358 A | 1/1994 | Goldhammer et al. | |
| 5,348,253 A | 9/1994 | Gratzer | |
| 8,933,819 B1 * | 1/2015 | Garrettson | G09F 21/10 340/945 |
| 8,944,386 B2 | 2/2015 | Gratzer | |
| 9,038,963 B2 | 5/2015 | Gratzer | |
| 9,302,766 B2 | 4/2016 | Gratzer | |
| 9,381,999 B2 | 7/2016 | Gratzer | |
| 9,751,638 B1 * | 9/2017 | Gagnon | B64D 47/02 |
| 10,780,991 B1 * | 9/2020 | Edquist | B64C 23/069 |
| D978,057 S * | 2/2023 | Bochud | B64C 29/0033 D12/345 |
| 12,000,581 B1 * | 6/2024 | Maddali | F21V 5/046 |
| 2009/0039204 A1 * | 2/2009 | Eberhardt | B64C 23/069 244/199.4 |
| 2009/0084904 A1 * | 4/2009 | Detert | B64C 23/065 244/199.4 |
| 2012/0312929 A1 * | 12/2012 | Gratzer | B64C 23/069 244/199.4 |
| 2013/0256460 A1 * | 10/2013 | Roman | B64C 5/08 244/199.4 |
| 2014/0346281 A1 * | 11/2014 | Gratzer | B64C 23/069 244/199.4 |
| 2016/0009379 A1 * | 1/2016 | Witte | B64D 45/02 156/60 |
| 2017/0073062 A1 * | 3/2017 | Firth | B64C 23/069 |
| 2017/0247105 A1 * | 8/2017 | Heller | B64C 23/069 |
| 2018/0009548 A1 * | 1/2018 | Meisner | B64D 47/06 |
| 2018/0118331 A1 * | 5/2018 | Blumer | B64D 15/04 |
| 2019/0329861 A1 * | 10/2019 | Kruse | B64C 3/185 |
| 2019/0329873 A1 * | 10/2019 | Proudler | B64C 3/185 |
| 2020/0094947 A1 * | 3/2020 | Commis | B64C 23/069 |
| 2020/0094987 A1 * | 3/2020 | Hessling-Von Heimendahl | F21S 43/14 |
| 2020/0398972 A1 * | 12/2020 | Petscher | B64C 3/10 |
| 2021/0197961 A1 | 7/2021 | Bochud et al. | |
| 2022/0097830 A1 * | 3/2022 | Sikavi | B64C 23/069 |

OTHER PUBLICATIONS

Boeing 737 MAX AT Winglet, 6 pages.

Bill Carey, "Aviation Partners Boeing Signs Customers for Winglet Mod," Aviation International News (AIN), Aug. 12, 2013, 2 pages, retrieved from the Internet Aug. 5, 2024, https://www.ainonline.com/aviation-news/air-transport/2013-08-12/aviation-partners-boeing-signs-customers-winglet-mod.

"737 MAX AT Winglet The most efficient winglet on any airplane," Boeing, 9 pages, retrieved from the Internet Aug. 5, 2024, https://www.boeing.com/commercial/737max/737-max-winglets.

* cited by examiner

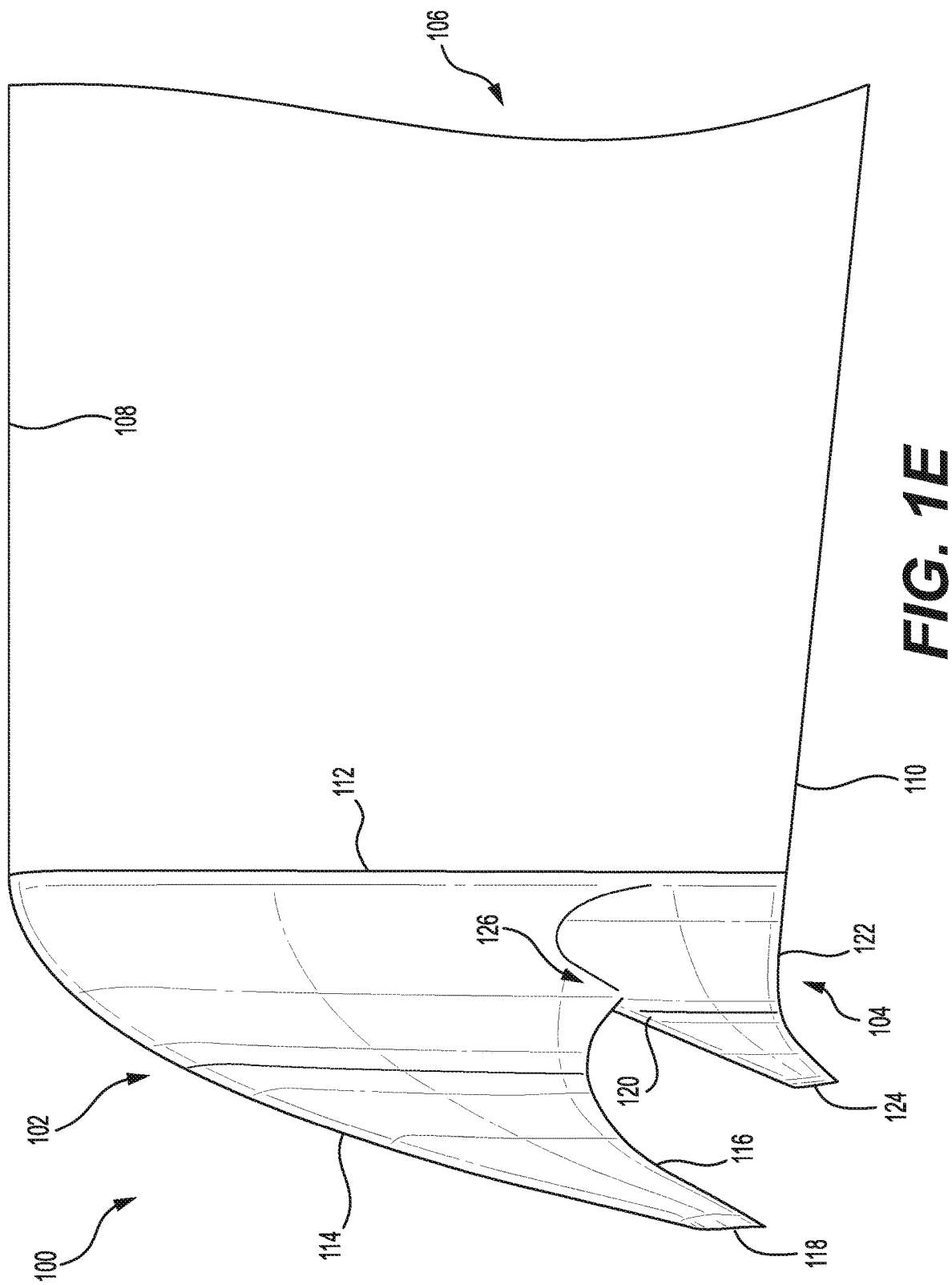

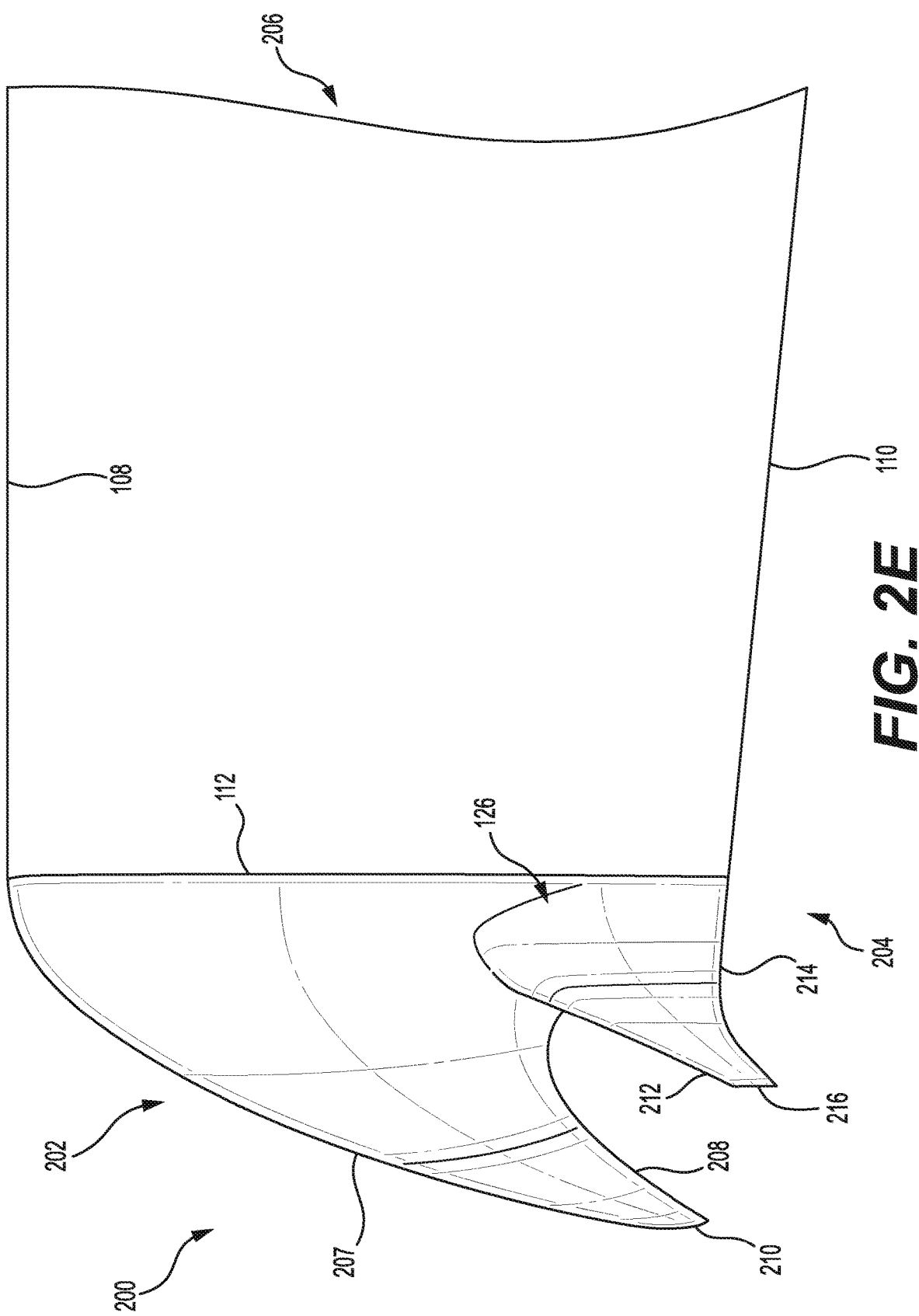

TANDEM SPLIT DIVERGENT WINGLET

CROSS-REFERENCE TO RELATED APPLICATIONS

This application claims the benefit of priority of U.S. Provisional Patent Application No. 63/353,260, entitled Tandem Split Divergent Winglet and filed on Jun. 17, 2022, the disclosure of which is herein incorporated by reference in its entirety.

BACKGROUND OF THE INVENTION

1. Field

The disclosed embodiments relate generally to aerodynamics and aircraft design. More specifically, the embodiments relate to winglets and wingtip devices for improvement in aerodynamic performance and integration of external wingtip lighting.

2. Description of the Related Art

Aircraft winglets are found in the prior art. For example, U.S. Patent No. to Goldhammer et al. describes a wing/winglet configuration. U.S. Pat. No. 8,944,386 to Gratzer describes a split blended winglet. U.S. Pat. No. 9,381,999 to Gratzer describes a curved wingtip. U.S. Pat. No. 5,348,253 to Gratzer describes a blended winglet. PCT Application No. WO 2020/146399 to Sikavi describes a split blended winglet. U.S. Patent Application Publication No. 2021/0197961 to Bochud et al. describes a winglet system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a tandem split divergent winglet for aircraft includes: a forward sail extending upwards from an outboard end of a wing of the aircraft, wherein the wing is a low wing extending from a lower portion of a fuselage of the aircraft, and wherein the forward sail includes an upwards cant angle with a continuous concave curvature facing the fuselage; and an aft sail extending downwards from the outboard end of the wing, wherein the aft sail emanates partially from the forward sail and partially from the outboard end of the wing, and wherein the aft sail includes a downwards cant angle and a continuous concave curvature facing the fuselage.

In another embodiment, a tandem split divergent winglet for aircraft includes: a forward sail extending downwards from an outboard end of a wing of the aircraft, wherein the wing is a high wing extending from an upper portion of a fuselage of the aircraft, and wherein the forward sail includes a downwards cant angle with a continuous concave curvature facing the fuselage; and an aft sail extending upwards from the outboard end of the wing, wherein the aft sail emanates partially from the forward sail and partially from the outboard end of the wing, and wherein the aft sail includes an upwards cant angle and a continuous concave curvature facing the fuselage.

BRIEF DESCRIPTION OF THE SEVERAL VIEWS OF THE DRAWINGS

Illustrative embodiments are described in detail below with reference to the attached drawing figures, which are incorporated by reference herein and wherein:

FIG. 1E illustrates a top-down view of the first winglet;

FIG. 2E illustrates a top-down view of the second winglet;

Figure 1A:
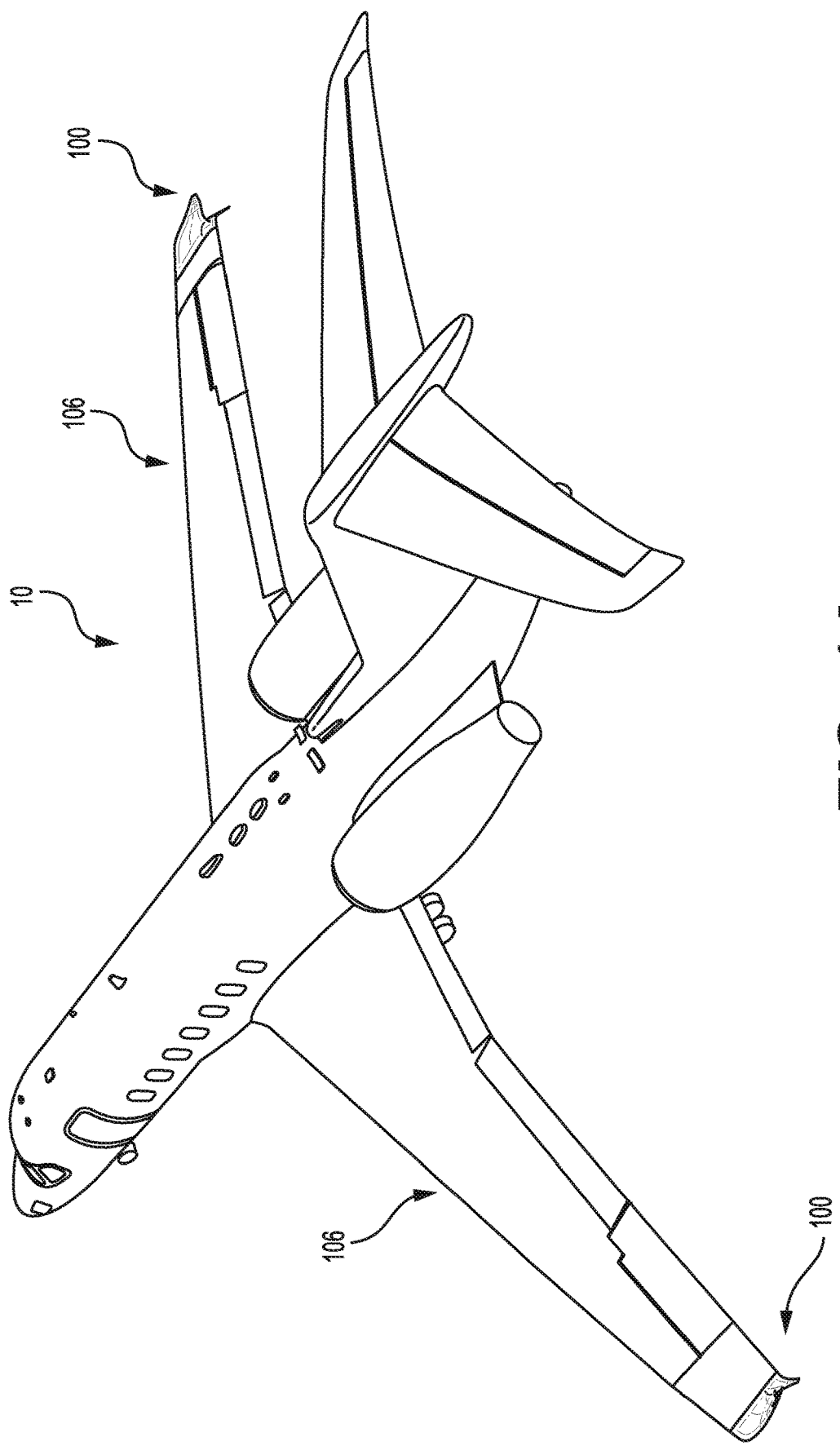
FIG. 1A illustrates an aircraft having a first winglet on each wing outboard edge, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Airplane wings are subject to drag when moving through the air. Skin friction, form, compressibility, and interference factors affect the amount of drag generated by a wing. Induced drag, which is drag developed as a direct result of the generation of lift, is characteristic of all wings of finite span and makes up a substantial amount of the overall drag experienced by the aircraft. Reduction of induced drag, therefore, has a substantial effect on the performance, fuel burn, overfly noise, and emissions of an aircraft. Changes in wing planform and the addition of wingtip devices, such as winglets, can lead to a reduction in induced drag. Winglets are often added to the outboard ends of wings and increase the effective aspect ratio of the wing without significantly increasing the wingspan.

Winglets and other wingtip devices are often equipped with anticollision lights that indicate the presence of the aircraft to the surroundings. When anticollision lights are not properly shielded, flight crew may become distracted and visually impaired due to the lights. To prevent the light from distracting the flight crew, anticollision lights are typically shielded; however, such shields contribute negatively to the performance of the aircraft.

What is needed are improved winglets for aircraft. Further, what is needed are winglets that can reduce or eliminate the light emanating from anticollision lights from reaching the aircraft flight crew while providing aerodynamic benefits to the aircraft.

Embodiments disclosed herein are generally related to a tandem split divergent winglet for aircraft. By use of the term "tandem", it is meant that the winglet includes two distinct portions that are offset along a longitudinal axis of an aircraft, with or without some overlap between the two distinct portions. For example, the tandem split divergent winglet may comprise a forward sail and an aft sail. The forward sail and the aft sail may be arranged in tandem such that either of the forward sail or the aft sail comprises a root chord line that is not fully contained within the chord length of the other sail. That is, the forward sail and the aft sail are disposed in a forward-aft staggered installation along a tip chord of the wing. By offsetting the forward sail and the aft sail in the direction parallel to the freestream air flow, a positive aerodynamic interaction may result that improves the lift-to-drag ratio of the wing.

The forward sail may have a orientation that is divergent from the orientation of the aft sail. For high-wing aircraft, having wings mounted near a top of a fuselage, the forward sail may be curved below the wing, and the aft sail may be curved above the wing. For low-wing aircraft, having wings mounted below a middle of a fuselage, the forward sail may be curved above the wing, and the aft sail may be curved below the wing. By staggering the leading sail and the aft sail, the wake of the leading sail has a positive interaction on the trailing sail. Broadly, the forward sail and the aft sail may be positioned to increase wingtip circulation at a reduced net drag increase that can improve the lift-to-drag ratio and increase the maximum lift capability of the aircraft.

One or more lights may be disposed on the aft sail. The forward sail may be positioned to substantially block the incidence of light from reaching the flight crew. The aerodynamic and light shielding benefits of the tandem split divergent winglet may be configured by adjusting the geometry of the forward sail and the aft sail.

FIG. 1A illustrates an aircraft 10 having winglets 100 on wings 106 for some embodiments. Winglets 100 may be included on various wings, such as straight wings and/or swept wings. As depicted in FIGS. 1A to 1J, wing 106 is a low-wing extending from a lower portion of the aircraft fuselage. It will be appreciated that winglets 100 may be included with various other wing configurations, such as mid-wing, dihedral wing, or the like, without departing from the scope hereof.

Figure 1B:
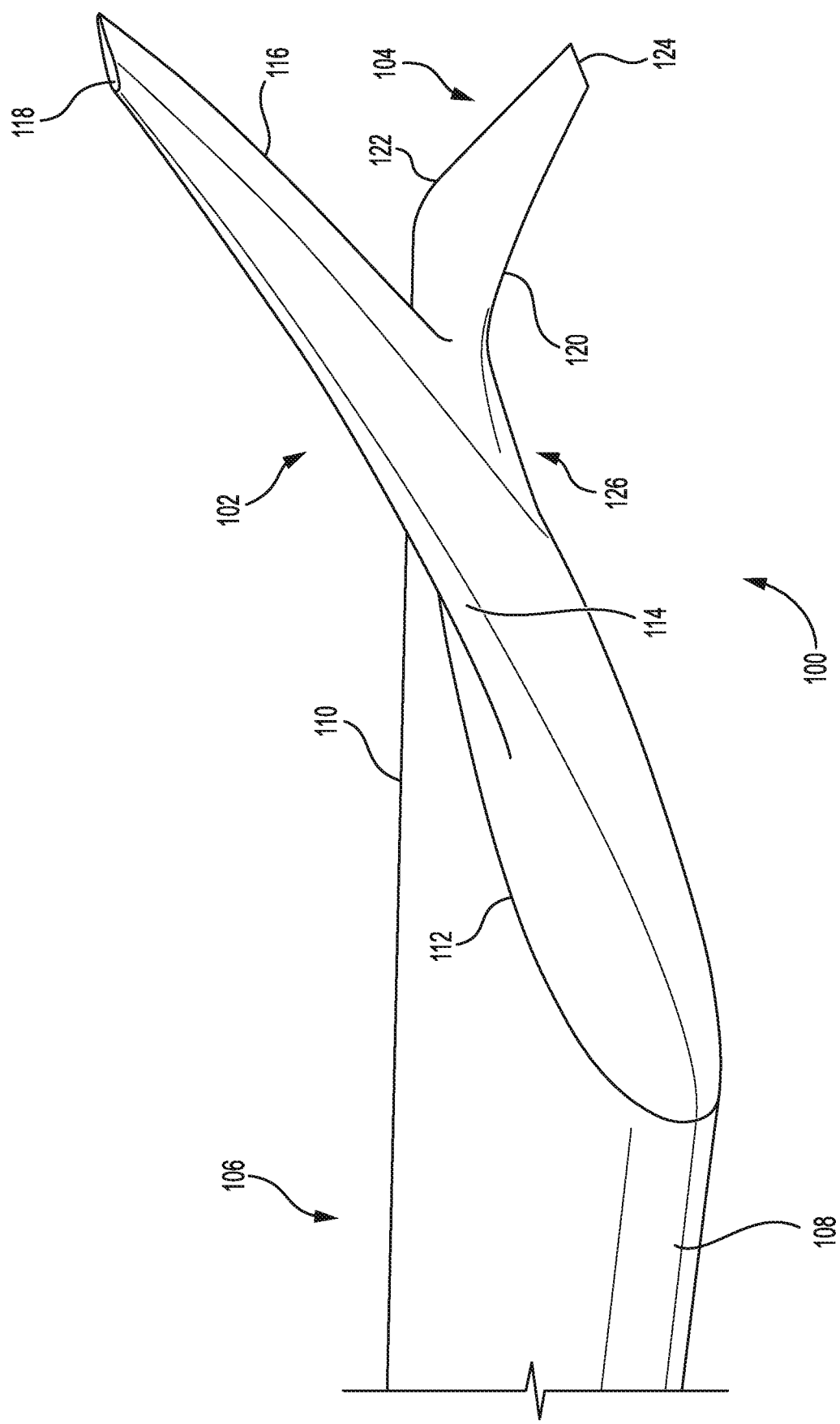
FIG. 1B illustrates a perspective view of the first winglet.
Figure 1C:
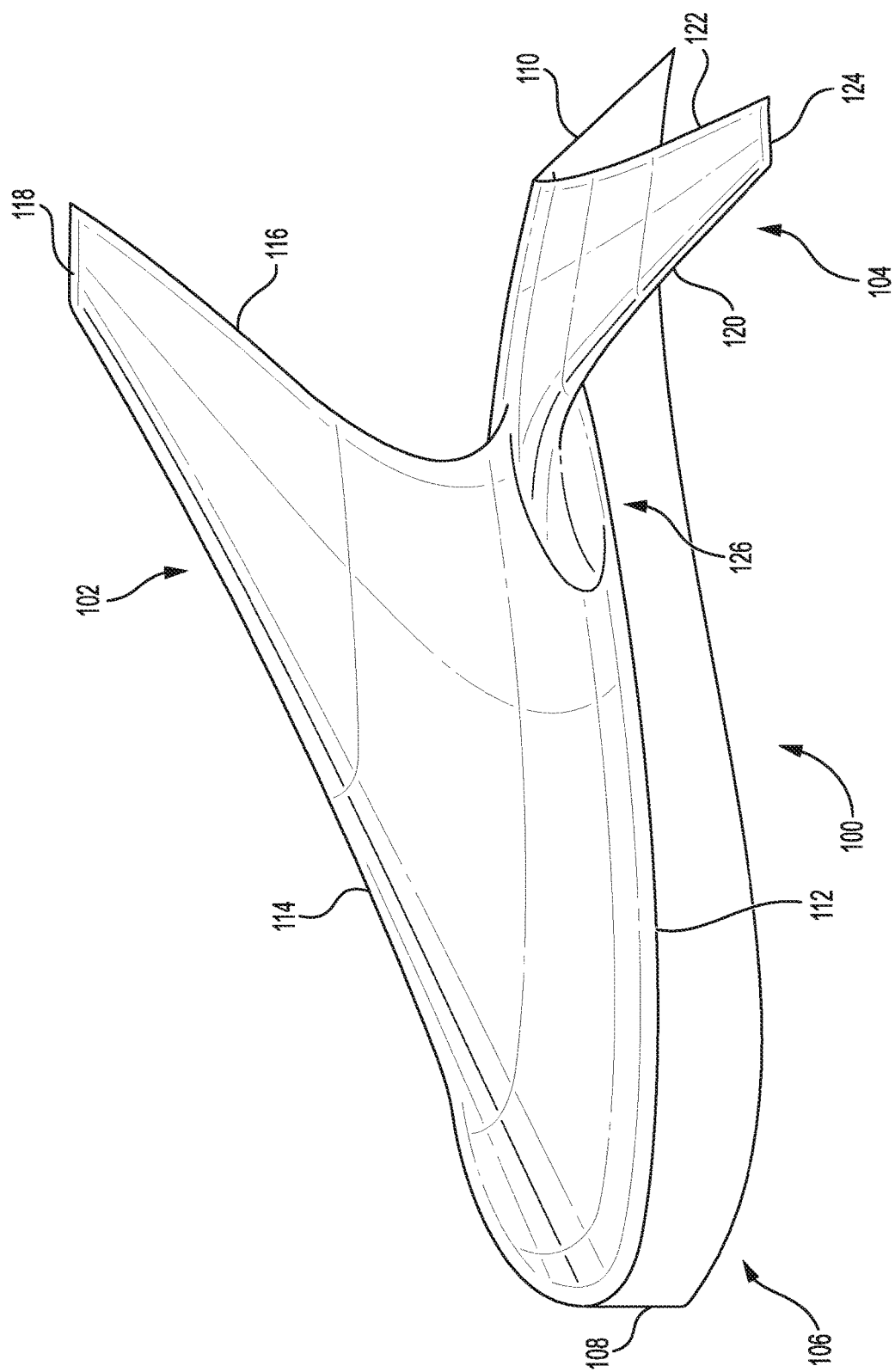
FIG. 1C illustrates an inboard-looking view of the first winglet.
Figure 1D:
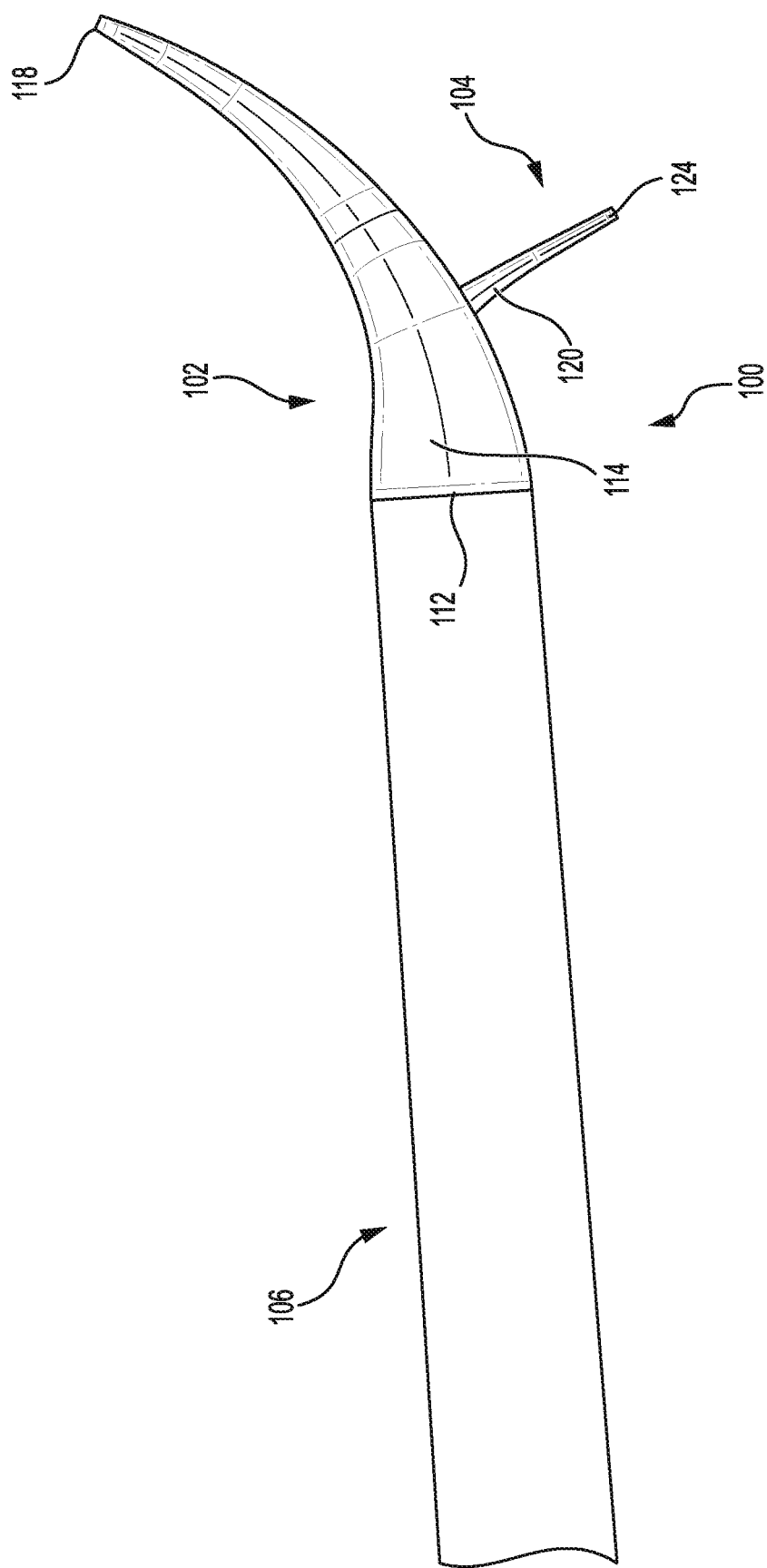
FIG. 1D illustrates a front view of the first winglet.
Figure 1F:
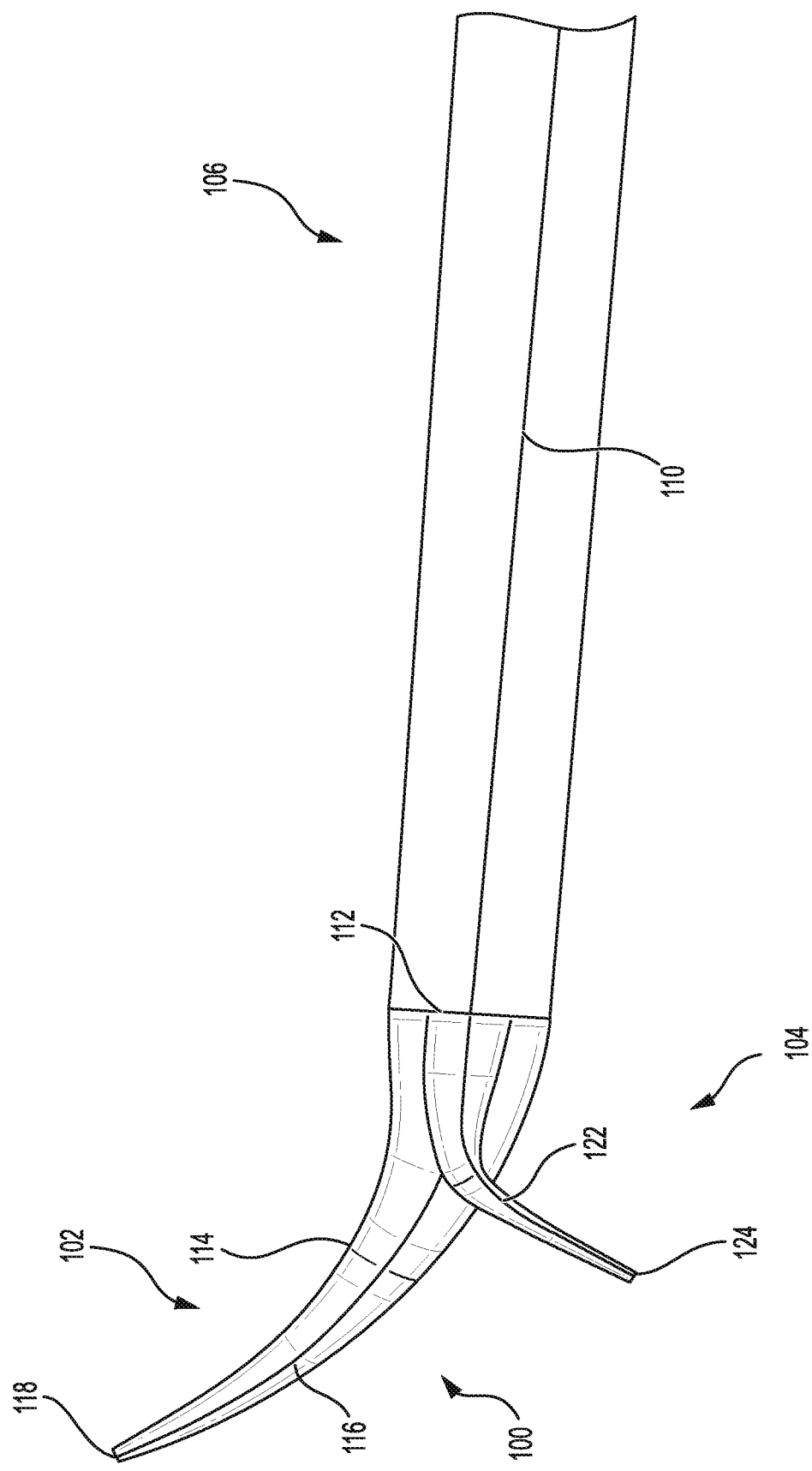
FIG. 1F illustrates a back view of the first winglet.

FIGS. 1B, 1C, 1D, 1E, and 1F illustrate winglet 100 in further detail for some embodiments. FIG. 1B illustrates a perspective view of winglet 100, FIG. 1C illustrates an inboard-looking view of winglet 100, FIG. 1D illustrates a front view of winglet 100, FIG. 1E illustrates a top-down view of winglet 100, and FIG. 1F illustrates a back view of winglet 100.

Looking first at FIG. 1B winglet 100 may comprise a forward sail 102 and an aft sail 104 attached to a wing 106. Wing 106 comprises a wing leading edge 108, a wing trailing edge 110, and a tip chord 112. In some embodiments, winglet 100 is formed as a separate piece from wing 106 and may be attached thereto. In some embodiments, winglet 100 is formed as part of aircraft wing 106 and extends seamlessly from tip chord 112.

Sails 102, 104 may be arranged in tandem such that the root chord line of one sail 102, 104 is not fully contained within the chord length of the other sail 102, 104. In some embodiments, an amount of overlap exists between sails 102, 104 such that aft sail 104 may partially emanate from forward sail 102 and partially from an outboard end of wing 106. In other embodiments, no overlap exists between sails 102, 104 and they both emanate from an outboard end of wing 106.

Sails 102, 104 may curve upwards or downwards relative to wing 106, but always in opposite directions. For example, forward sail 102 may be curved substantially upwards and aft sail 104 may be curved substantially downwards as illustrated in FIGS. 1A-1F. Alternatively, the forward sail may be curved substantially downwards, and the aft sail may be curved substantially upwards (see FIGS. 2A-2F). Thus, sails 102, 104 are configured to have divergent cant angles.

Forward sail 102 comprises a forward sail leading edge 114 and a forward sail trailing edge 116. Forward sail leading edge 114 and forward sail trailing edge 116 may extend from wing 106 to form forward tip 118. Aft sail 104 comprises an aft sail leading edge 120 and an aft sail trailing edge 122. Aft sail leading edge 120 and aft sail trailing edge 122 may extend from wing 106 to form aft tip 124. In some embodiments, tips 118, 124 are rounded, pointed, or flat. In some embodiments, tips 118, 124 comprise a rounded cap.

In some embodiments, sails 102, 104 overlap such that aft sail leading edge 120 may extend from a bottom surface of forward sail 102 as indicated by overlap region 126. In other embodiments, sails 102, 104 are directly adjacent such that no overlap between the root chord lines thereof is present in winglet 100. In some embodiments, a maximum thickness portion of the airfoil of aft sail 104 is disposed behind (i.e., aft) relative to a maximum thickness portion of the airfoil of forward sail 102.

Forward sail leading edge 114 may emanate from wing leading edge 108 and may be generally curved from wing leading edge 108 to forward tip 118. In some embodiments, forward sail leading edge 114 comprises a complex curve with a smaller radius of curvature near wing leading edge 108 that increases as forward sail leading edge 114 sweeps aft towards forward tip 118. In some embodiments, the radius of curvature approaches infinity as forward sail leading edge 114 curves toward forward tip 118. In some embodiments, as forward sail leading edge 114 curves towards forward tip 118, the curvature transitions into a straight line. In some embodiments, forward sail leading edge 114 is curvilinear from wing leading edge 108 to forward tip 118.

As best illustrated in FIGS. 1C and 1E, in some embodiments, forward sail trailing edge 116 comprises a complex curve with a smaller radius of curvature near overlap region 126 that increases as forward sail trailing edge 116 curves aft towards forward tip 118. In some embodiments, the radius of curvature nears infinity as forward sail trailing edge 116 curves toward forward tip 118. Forward sail 102 may comprise a root chord length comprising about 40% to about 80% the length of tip chord 112. In some embodiments, forward sail 102 comprises a root chord length comprising about 70% the length of tip chord 112. In some embodiments, forward sail 102 is tapered such that the chord length thereof decreases from tip chord 112 to forward tip 118.

As illustrated in FIGS. 1C and 1E, aft sail leading edge 120 may emanate from a bottom surface of forward sail 102, and aft sail trailing edge 122 may extend from wing trailing edge 110. As illustrated in FIGS. 1B and 1C, aft sail leading edge 120 may comprise a curved portion emanating from overlap region 126 before transitioning into the substantially linear portion. Looking at FIGS. 1E and 1F, in some embodiments, a first portion of aft sail trailing edge 122 may extend linearly from wing trailing edge 110 before curving downwards and sweeping aft of wing trailing edge 110. The curve of aft sail trailing edge 122 may then transition back to a substantially linear curve as aft sail trailing edge 122 curves towards aft tip 124. Aft sail 104 may comprise a root chord length comprising about 20% to about 50% the chord length of tip chord 112. In some embodiments, aft sail 104 is tapered such that the chord length thereof decreases from tip chord 112 to aft tip 124.

Looking at FIG. 1D, in some embodiments, forward sail 102 extends outboard further than aft sail 104. In some embodiments, a lateral distance between forward tip 118 and aft tip 124 is about 50 millimeters to about 100 millimeters. In some embodiments, forward sail 102 comprises a greater height than aft sail 104. In some embodiments, a vertical distance between forward tip 118 and aft tip 124 is about 350 millimeters to about 450 millimeters. In some embodiments, a lateral distance between tips 118, 124 is about 25% of a vertical distance between tips 118, 124. It should be noted that these dimensions are provided for example purposes and that one of skill in the art will appreciate that the separation of forward tip 118 and aft tip 124 and various other geometric characteristics of winglet 100 may change for various use cases thereof. The separation between forward sail 102 and aft sail 104 may vary based on the sweep angles thereof. As described above, a maximum thickness portion of aft sail 104 may be disposed behind a maximum portion thickness of forward sail 102.

Sails 102, 104 may comprise divergent cant angles, where each sail is canted in different directions (e.g., upwards or downwards with respect to the wing 106). Aft sail 104 is curved below wing 106 may be considered to have a negative cant angle, while forward sail 102 is curved above wing 106 may be considered to have a positive cant angle. In some embodiments, aft sail 104 has a larger cant angle magnitude than forward sail 102. In some embodiments, forward sail 102 has a larger cant angle magnitude than aft sail 104. In some embodiments, aft sail 104 comprises a cant angle of about negative 40 degrees to about negative degrees. In some embodiments, aft sail 104 is an in-wing aft sail comprising a zero degree or near zero degree cant angle.

In embodiments, as best viewed in FIG. 1D, sails 102, 104 comprise a surface curvature in which the inboard-facing surface has a continuous concave curvature and the outboard-facing surface has a continuous convex curvature. In some embodiments, the surface curvature flattens towards the tip (e.g., the radius of curvature of the surface may approach infinity towards the tip).

Looking again at FIGS. 1C and 1E, in some embodiments, sails 102, 104 are swept. Each sail 102, 104 may be swept in an aft direction relative to wing 106. Sails 102, 104 may be swept forward without departing from the scope hereof. In some embodiments, sails 102, 104 comprise distinct sweep angles. In other embodiments, sails 102, 104 comprise substantially similar sweep angles. In some embodiments, the sweep angle of forward sail 102 is larger than the sweep angle of aft sail 104. In other embodiments, the sweep angle of forward sail 102 is smaller than the sweep angle of aft sail 104. As shown in FIG. 1C, forward sail 102 may be swept aft such that forward sail 102 partially projects over aft sail 104. In some embodiments, forward sail 102 may be swept such that forward tip 118 is located aft of wing trailing edge 110. In some embodiments, aft sail 104 is swept behind wing trailing edge 110 such that at least a portion of aft tip 124 is aft of wing trailing edge 110. In some embodiments, the entirety of aft tip 124 is aft of wing trailing edge 110.

The sweep angles of sails 102, 104 may be tailored to increase the aerodynamic benefits provided from the interaction between the wake of forward sail 102 on trailing sail 104 that may lead to an improvement in lift-to-drag ratio when compared to traditional single-sail winglets as discussed further below. Similarly, the twist angles of sails 102, 104 may be configured based on the planform geometry of sails 102, 104. In some embodiments, sails 102, 104 comprise similar twist angles. In other embodiments, sails 102, 104 comprise distinct twist angles.

The staggered positioning of sails 102, 104 may provide aerodynamic benefits to the aircraft. A reduction in induced drag may be realized when the trailing edges of sails 102, 104 are nonplanar. The trailing edges 116, 122 may be nonplanar by curving sails 102, 104 off-wing. The nonplanar trailing edges 116, 122 result in non-linear wakes at tips 118, 124 and may redistribute vorticity. Further, by staggering sails 102, 104 in tandem, a positive interaction therebetween may result due, at least in part, to the interaction of the downwash from forward sail 102 on aft sail 104. With forward sail 102 diverging from aft sail 104, a non-linear wake may be realized at the tip that can reduce the induced drag.

As previously discussed, aircraft wings or winglets generally have one or more lights disposed thereon that provide the surroundings with an indication of the presence of the aircraft. The lights may include but are not limited to one or more of position, anticollision, ground illumination, and accent lights. Due to the requisite brightness of the lights, the light emanating from the lights may distract the flight crew of the aircraft. As such, the lights are often shielded to prevent the light from reaching the flight crew. However, such shielding adds a wetted area in the form of a "fence" to wing 106 and, therefore, increases the drag on the aircraft.

Depending on the installation of the wing (high, low, mid, fore, or aft) and the span and angle of the individual sails relative to each other, placement of the lights may be selected to maximize the field of view and minimize the light interference to the crew and passengers. For example, by staggering sails 102, 104, the lights may be attached to aft sail leading edge 120, and forward sail 102 may act as a lighting barrier for the lights (see FIG. 1I and FIG. 1J). In a low-wing aircraft, the pilot will sit in the cockpit at a location that is forward and above wing 106. Thus, by providing winglet 100 with a forward sail 102 that is curved opposite of aft sail 104, forward sail 102 may be disposed between the lights and the pilot such that forward sail 102 substantially blocks the light emanating from the lights from reaching the pilot. Thus, flight crew safety is improved without negatively affecting the aircraft performance by adding shielding to the lights. The geometry of forward sail 102 (e.g., cant angle, sweep angle, twist angle, the amount of overlap with aft sail 104, etc.) may be configured to block more or less light from the lights as desired. As such, winglet 100 may both improve the aerodynamics of the aircraft (due to the divergent cant angle and interaction of the nonplanar lifting surfaces as previously discussed) and simultaneously improve the safety of the aircraft by blocking light from interfering with the flight crew. The performance of the aircraft is further improved by eliminating the use of a shield to block light that adds drag to the aircraft.

Figure 1G:
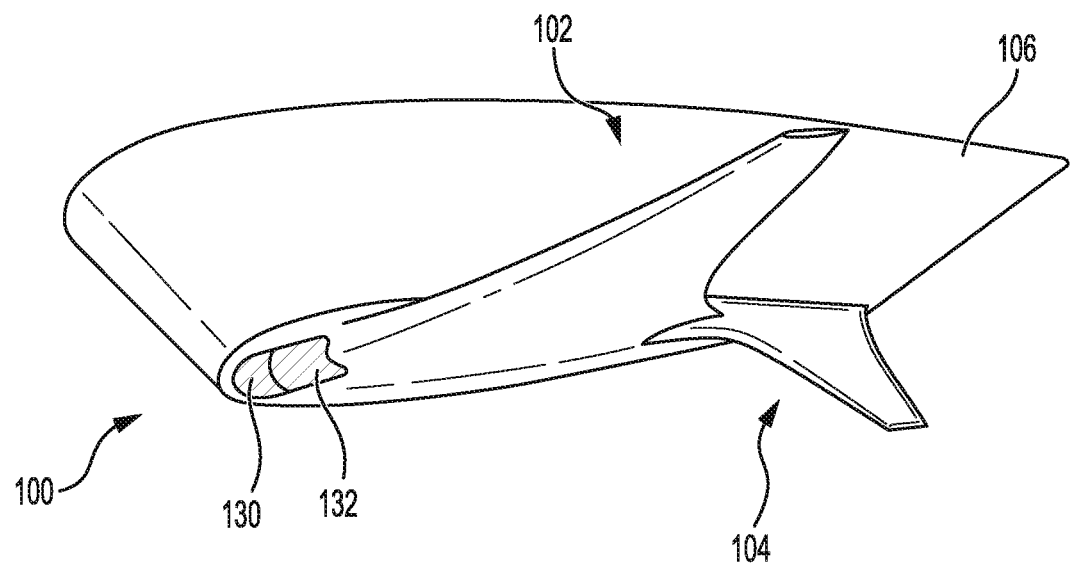
FIG. 1G illustrates an inboard-looking view of the first winglet having integrated lights, in an embodiment.

FIG. 1G illustrates an inboard-looking view of winglet 100 having a a first forward sail leading edge light 130 and a second forward sail leading edge light 132 integrated along a leading edge of forward sail 102. Specifically, the lights 130, 132 are integrated within forward sail leading edge 114 such that their outer profile is in line with a profile of the forward sail leading edge 114 and the outer lens of lights 130, 132 matches a curvature of forward sail leading edge 114. Based on the sweep of forward sail 102 and wing 106, lights 130, 132 are angled away from a cockpit window of the aircraft to avoid distracting the flight crew. In embodiments, lights 130, 132 are also angled away from the aircraft cabin to avoid distracting passengers.

Figure 1H:
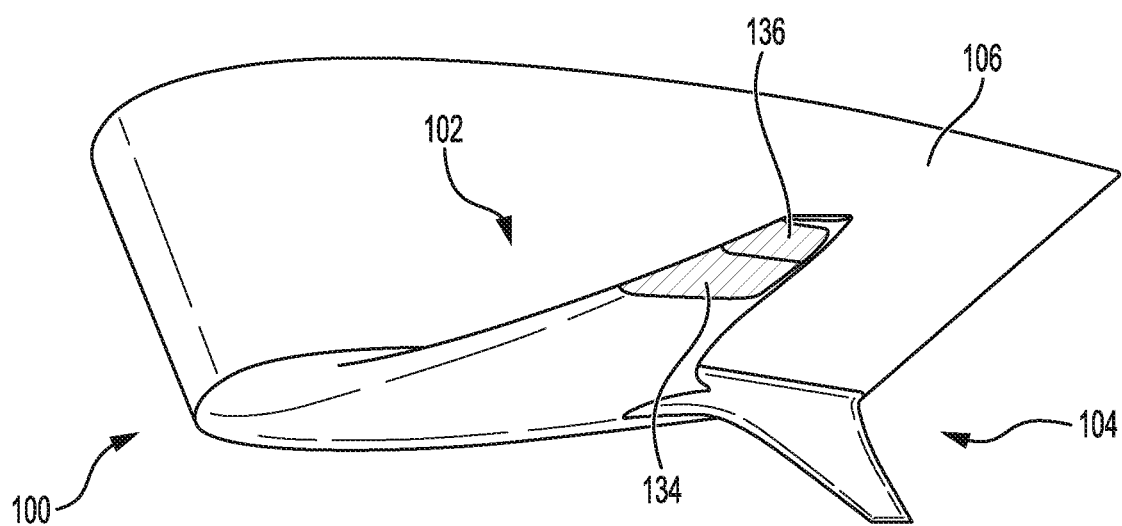
FIG. 1H illustrates an inboard-looking view of the first winglet having integrated lights, in another embodiment.

FIG. 1H illustrates an inboard-looking view of winglet 100 having a first underside forward sail tip light 134 and a second underside forward sail tip light 136 integrated within an outboard facing portion of forward sail 102. In embodiments, lights 134, 136 cover forward sail leading edge 114 and extend to forward sail trailing edge 116 on an outboard facing surface (i.e., an underside of forward sail 102). As depicted in FIG. 1H, light 136 may be disposed substantially close to forward tip 118 and light 134 may be disposed immediately inboard of light 136. By being located on the outboard facing underside of forward sail 102, due to the cant angle and aft sweep of forward sail 102, lights 134, 136 face substantially away from the aircraft cockpit window to avoid distracting the flight crew. Lights 134,136 also face substantially away from the aircraft cabin improving passenger comfort.

Figure 1I:
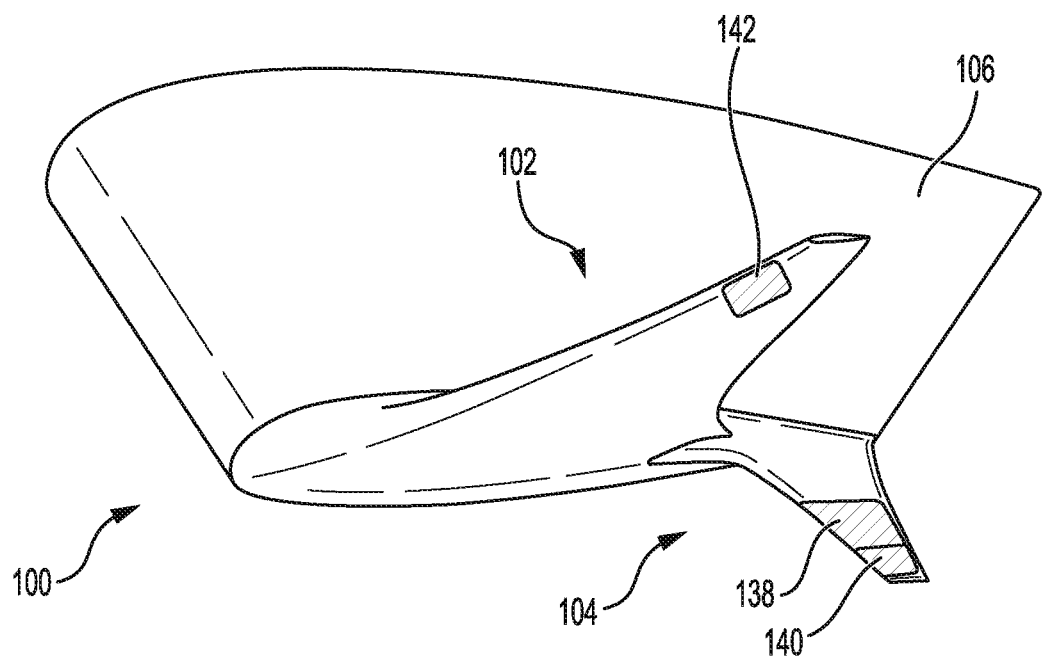
FIG. 1I illustrates an inboard-looking view of the first winglet having integrated lights, in yet another embodiment.

FIG. 1I illustrates an inboard-looking view of the winglet 100 having a first aft sail outboard light 138, a second aft sail outboard light 140, and a forward sail leading edge light 142. Lights 138, 140 are disposed on an outboard (top side) of aft sail 104. With wing 106 being a low-wing extending from a lower portion of an aircraft fuselage, by staggering sails 102, 104, with forward sail 102 positioned forward of aft sail 104, and with forward sail 102 being canted upwards and aft sail 104 being canted downwards, forward sail 102 has a geometry and orientation that provides a lighting barrier between lights 138, 140 and the aircraft cockpit window. In some embodiments, lights 138, 140 may include high intensity lights (e.g., strobe lights), and/or lower intensity lights (e.g., navigation red/green lights). Light 142 is integrated within forward sail leading edge 114 such that the aft sweep and upwards cant angle of forward sail 102 causes the emitted light to emanate away from the aircraft cockpit window.

Figure 1J:
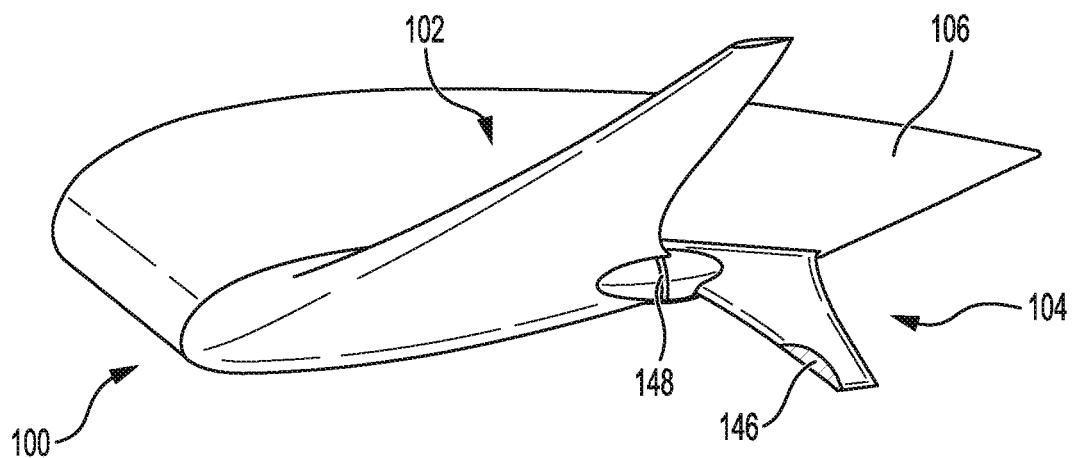
FIG. 1J illustrates an inboard-looking view of the first winglet having integrated lights, in still another embodiment

FIG. 1J illustrates an inboard-looking view of winglet 100 having an aft sail leading edge light 146 and a fairing light 148. Light 146 is integrated along aft sail leading edge 120 such that forward sail 102 provides a lighting barrier that blocks light emitted from light 146 from reaching the aircraft cockpit window. Fairing light 148 is integrated within a sail intersection fairing along an intersection of forward sail 102 and aft sail 104. In embodiments, fairing light 148 is wrapped around a portion of the fairing. The fairing is located on an underside of forward sail 102 facing outboard such that light emanating from fairing light 148 is shielded by forward sail 102 from shining directly at the aircraft cockpit window.

In FIG. 1G, FIG. 1H, FIG. 1I, FIG. 1J, the various lights may have an outer lens profile that matches a shape of the forward sail 102 or aft sail 104. In some embodiments, the lights may comprise a substantially transparent or partially transparent outer lens. Additional light configurations are possible without departing from the scope hereof. For example, intermediate coverage lights that cover a portion of the overall chord of forward sail 102 or aft sail 104 may be employed; alternatively, lights that illuminate through both the upper and lower surface of forward sail 102 or aft sail 104 without extending to the leading edge or trailing edge may be employed (see e.g., light 233 of FIG. 2G).

Figure 2A:
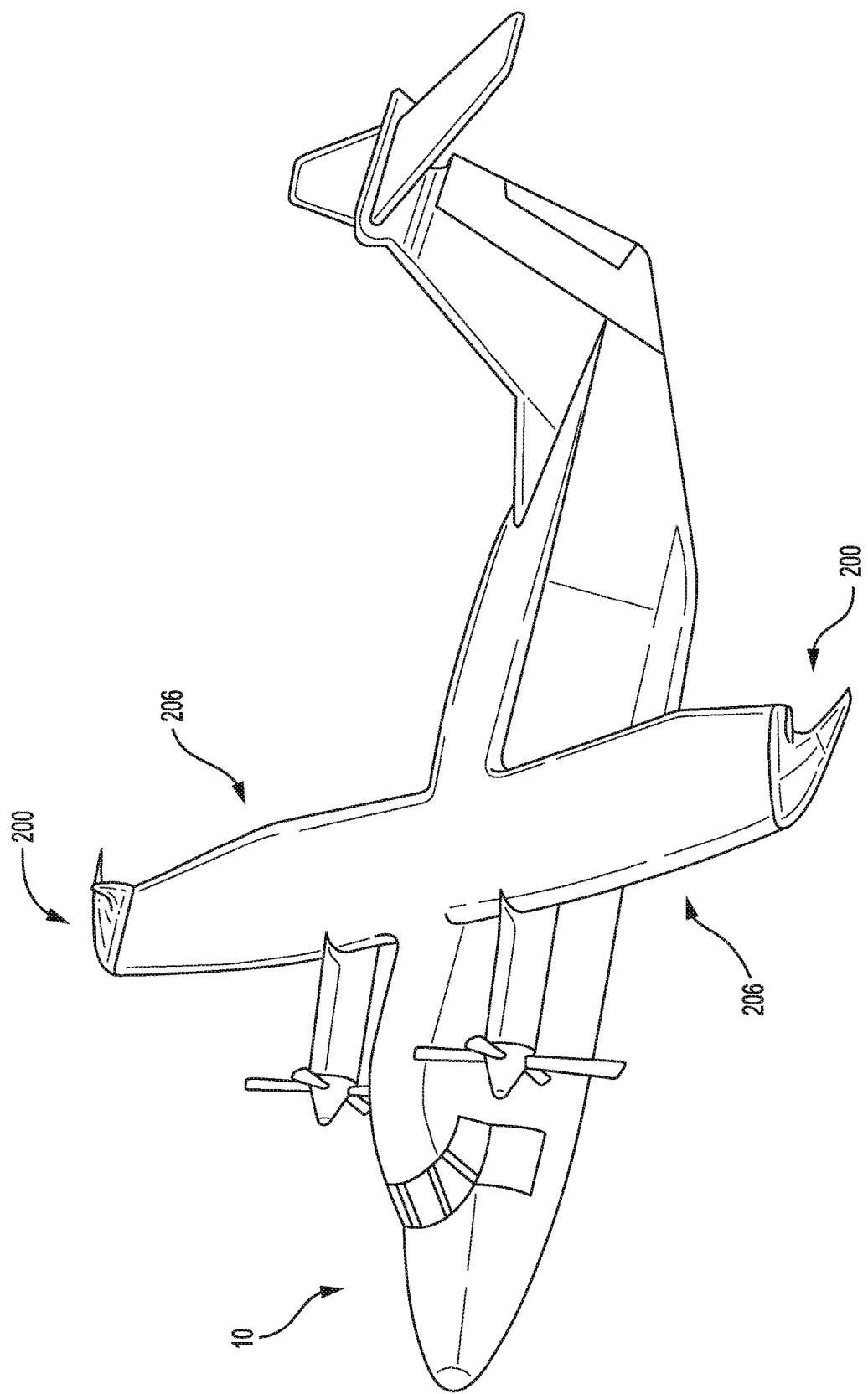
FIG. 2A illustrates a second winglet on each wing outboard edge of the aircraft, in an embodiment.

FIG. 2A illustrates aircraft 10 having winglets 200 on wings 206 for some embodiments. Winglets 200 may be included on various wings, such as straight wings and/or swept wings. As depicted in FIGS. 2A to 2J, wing 206 is a high-wing extending from an upper portion of the aircraft fuselage. It will be appreciated that winglets 200 may be included with various other wing configurations, such as mid-wing, dihedral wing, or the like, without departing from the scope hereof.

Figure 2B:
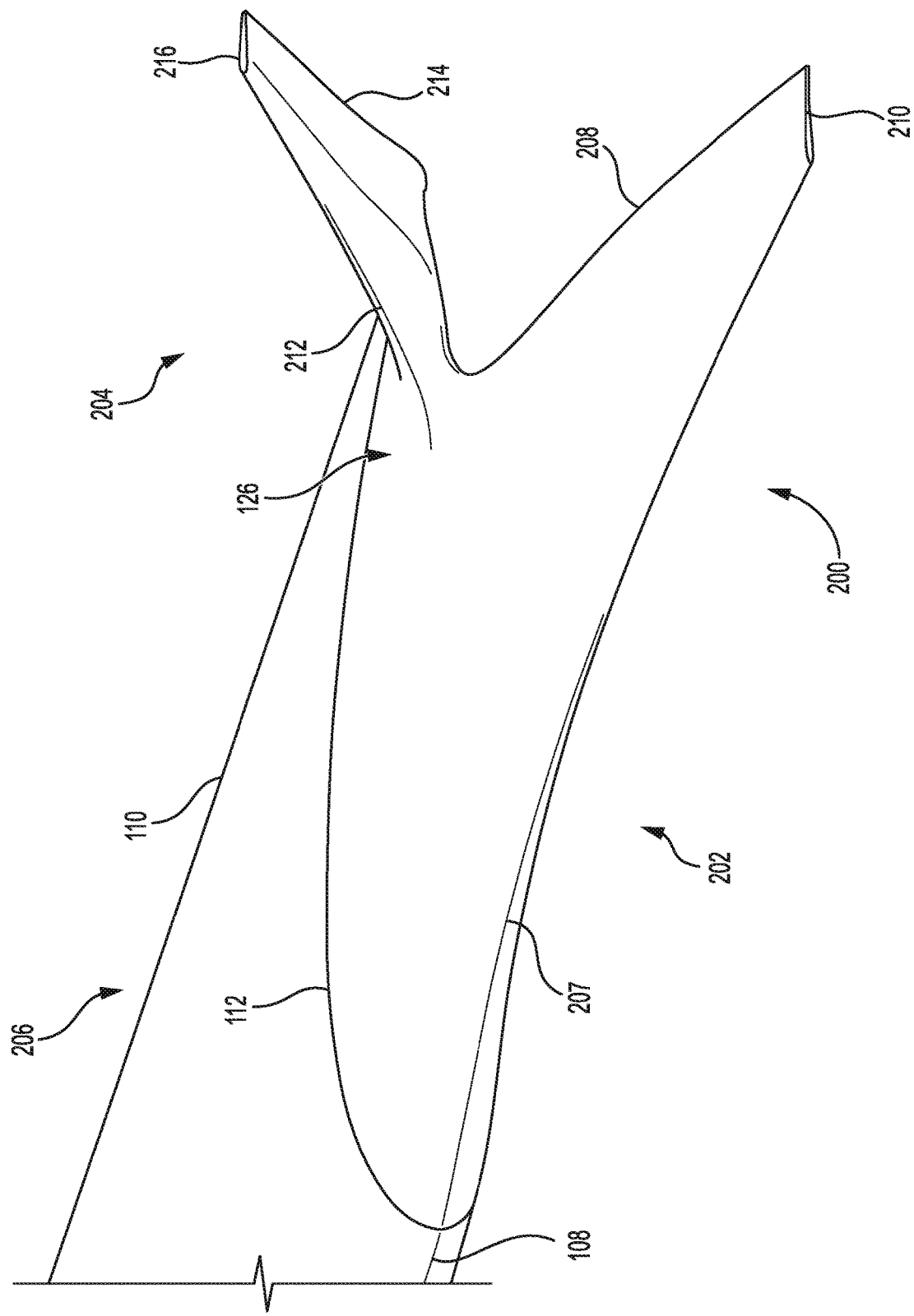
FIG. 2B illustrates a perspective view of the second winglet.
Figure 2C:
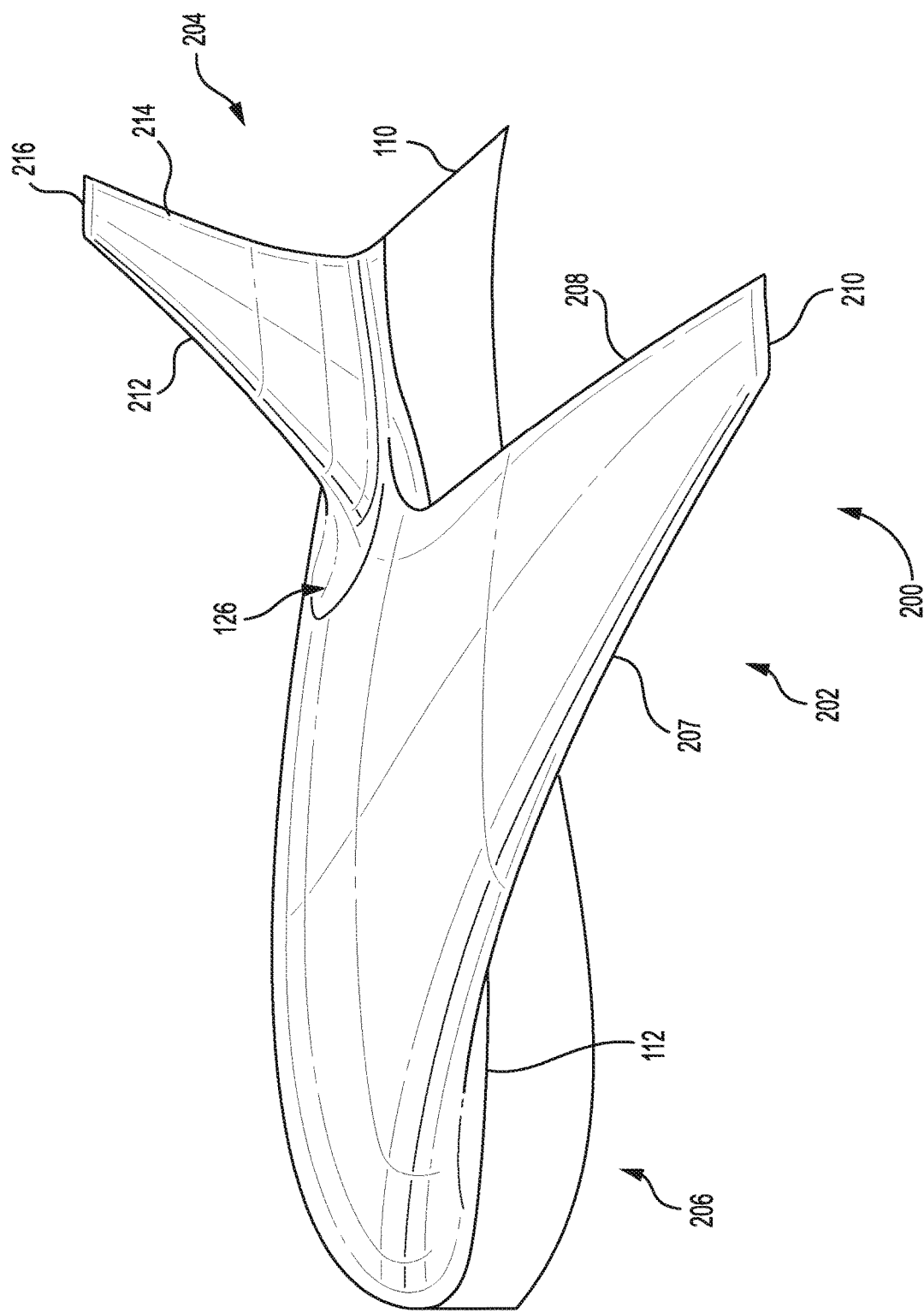
FIG. 2C illustrates an inboard-looking view of the second winglet.
Figure 2D:
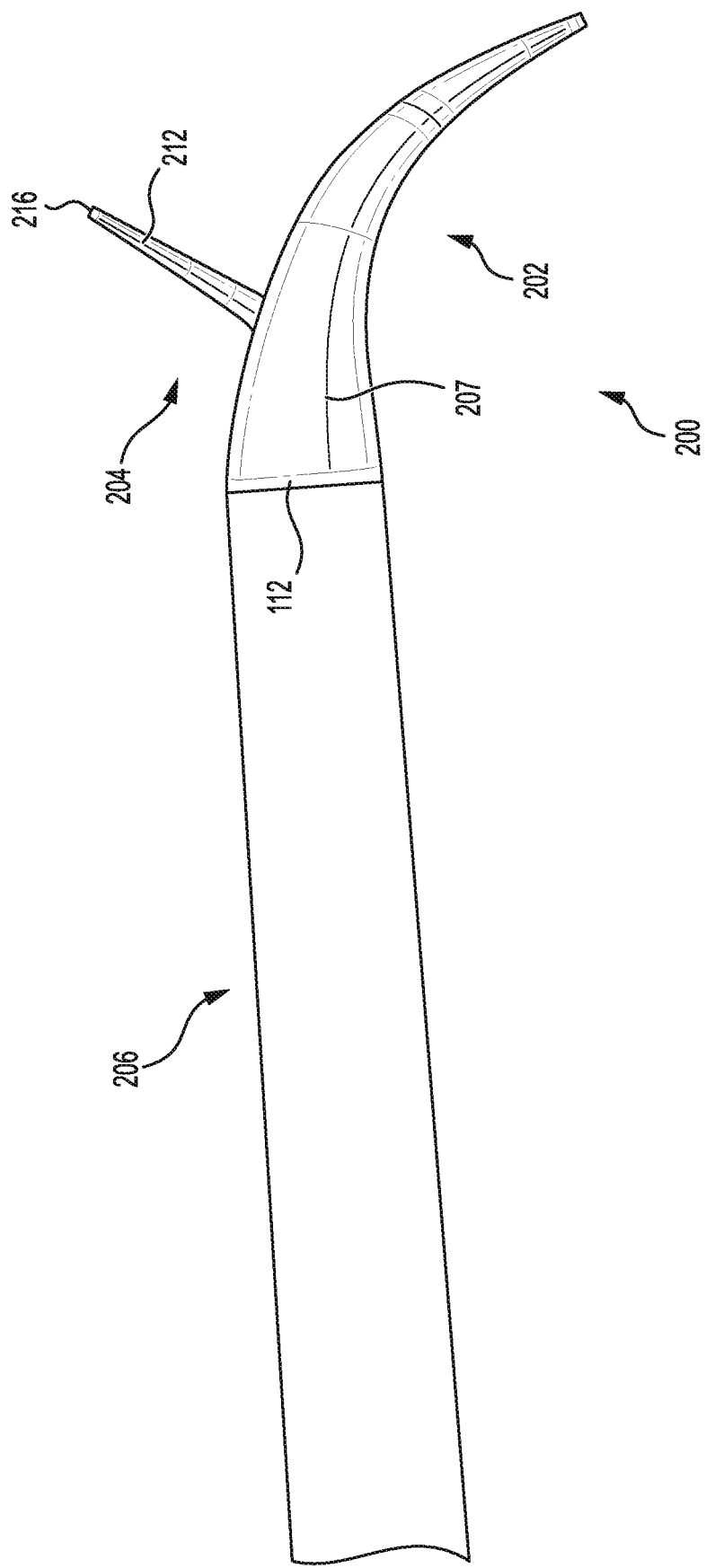
FIG. 2D illustrates a front view of the second winglet.
Figure 2F:
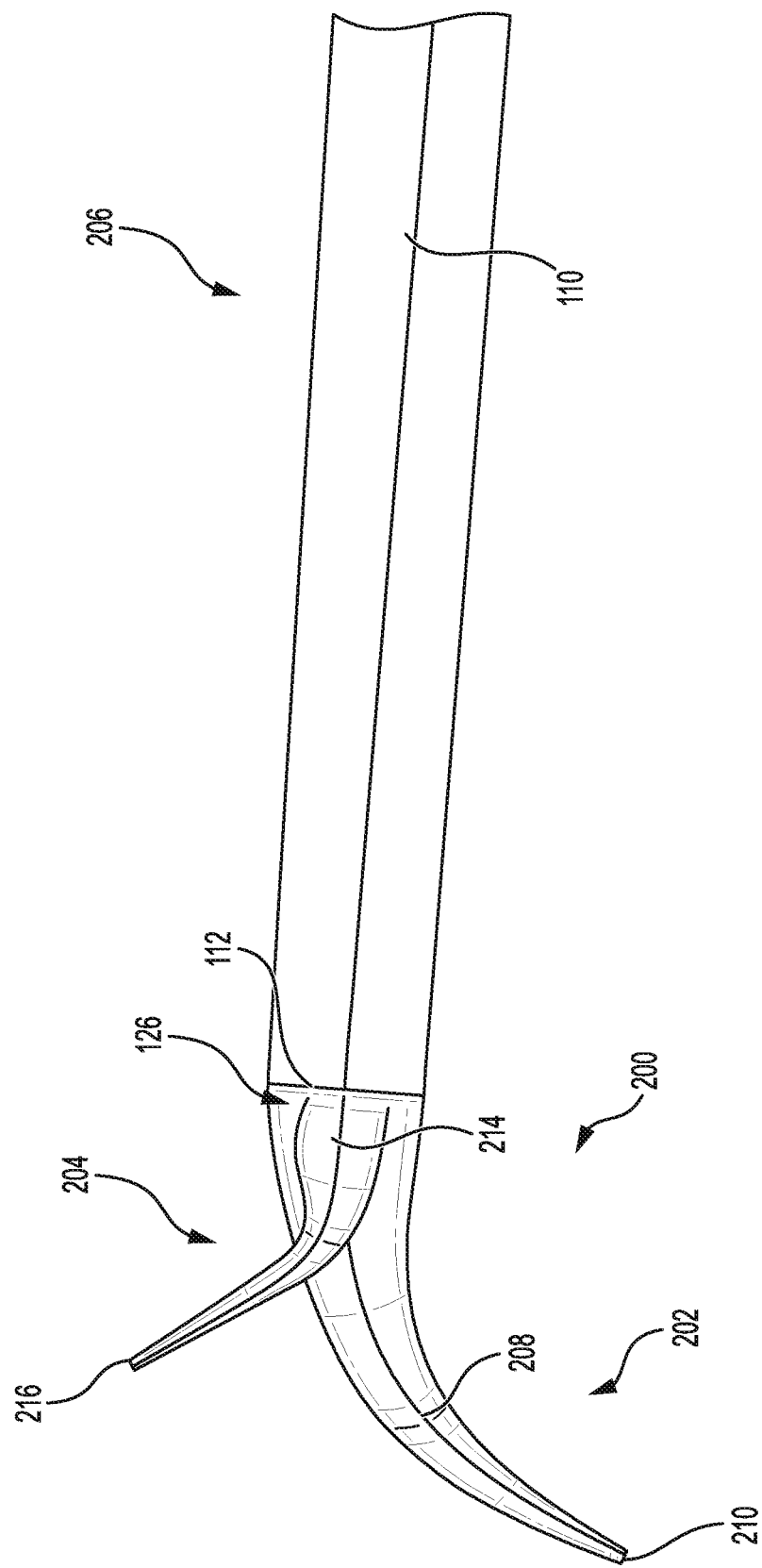
FIG. 2F illustrates a back view of the second winglet.

FIGS. 2B, 2C, 2D, 2E, and 2F illustrate winglet 200 in further detail for some embodiments. FIG. 2B illustrates a perspective view of winglet 200, FIG. 2C illustrates an inboard-looking view of winglet 200, FIG. 2D illustrates a front or aft-looking view of winglet 200, FIG. 2E illustrates a top-down view of winglet 200, and FIG. 2F illustrates a back or forward-looking view of winglet 200. Where common features or elements are unchanged, they are not discussed separately from their description with respect to FIGS. 1A-1F. As previously mentioned, a tandem split divergent winglet 200 may comprise a forward sail 202 curved downwards from wing 206 and an aft sail 204 curved upwards from wing 206. A winglet 200 having a downwards-curved forward sail 202 and an upwards-curved aft sail 204 may be used on high-wing aircraft where wing 206 is attached above the fuselage of the aircraft (see e.g., FIG. 2A).

Forward sail 202 may have a forward sail leading edge 207 extending from wing leading edge 108 and a forward sail trailing edge 208 extending from overlap region 126. Forward sail leading edge 207 and forward sail trailing edge 208 may curve and extend outboard from wing 206 to form forward tip 210. Looking at FIG. 2D, forward sail leading edge 207 may be substantially linear extending from wing leading edge 108 before transitioning into a curved portion near a middle of forward sail 202. From the curved portion of forward sail leading edge 207, the radius of curvature thereof may increase and may near infinity as forward sail leading edge 207 curves downward and nears forward tip 210. In some embodiments, as forward sail leading edge 207 curves towards forward tip 210, the curvature transitions into a straight line. In some embodiments, forward sail leading edge 207 is linear from wing leading edge 108 to forward tip 210.

FIG. 2E illustrates the sweep of forward sail leading edge 207 as forward sail leading edge 207 curves from wing leading edge 108 to tip 210. In some embodiments, forward sail 202 may be swept such that forward tip 210 is located aft of wing trailing edge 110. In some embodiments, tip 210 is located aft of tip 216. Forward tip 210 may be substantially similar to forward tip 118. Looking at FIG. 2F, the curvature of forward sail trailing edge 208 is illustrated for some embodiments. Forward sail trailing edge 208 may emanate from overlap region 126 and curve downwards towards forward tip 210. As forward sail trailing edge 208 curves towards forward tip 210, the radius of curvature of forward sail trailing edge 208 may near infinity. Forward sail 202 may comprise a root chord length comprising about 40% to about 80% the length of tip chord 112. In some embodiments, forward sail 202 comprises a root chord length comprising about 70% the length of tip chord 112. In some embodiments, forward sail 202 is tapered such that the chord length thereof decreases from tip chord 112 to forward tip 210.

Aft sail 204 may have an aft sail leading edge 212 which may extend from near a top surface of forward sail 202. An aft sail trailing edge 214 may emanate from wing trailing edge 110. Aft sail leading edge 212 and aft sail trailing edge 214 may curve and extend outboard from wing 206 to form aft tip 216. The curvature of aft sail leading edge 212 is illustrated in FIG. 2C. Aft sail leading edge 212 may curve upwards from forward sail 202 and transition into a substantially linear curve as aft sail leading edge 212 extends towards aft tip 216. The curvature of aft sail trailing edge 214 is illustrated in FIG. 2F. Aft sail trailing edge 214 may emanate from wing trailing edge 110 substantially linearly before transitioning to a curved portion with a finite radius of curvature that, in turn, transitions to a substantially linear curve as aft sail trailing edge 214 nears aft tip 216. Aft tip 216 may be substantially similar to aft tip 124. Tips 210, 216 may be pointed, rounded, or flat without departing from the scope hereof. Aft sail 204 may comprise a root chord length comprising about 20% to about 50% the length of tip chord 112. In some embodiments, aft sail 204 is tapered such that the chord length thereof decreases from tip chord 112 to forward tip 216.

Similar to winglet 100, winglet 200 may comprise sails 202, 204 with divergent cant angles, where each sail is canted in different directions (e.g., upwards or downwards) with respect to the wing 206). In some embodiments, whether curved upwards or downwards from wing 206, an aft sail 104, 204 may comprise a greater-magnitude cant angle than a forward sail 102, 202. In some embodiments, forward sail 202 comprises a cant angle magnitude of about 15 degrees to about 45 degrees. In some embodiments, an aft sail 204 comprises a cant angle magnitude about 40 degrees to about 60 degrees. In some embodiments, aft sail 204 is an in-wing aft sail comprising a zero degree or near zero degree cant angle.

As illustrated in FIG. 2C, in some embodiments, forward sail 202 extends outboard further than aft sail 204. In some embodiments, a lateral distance between forward tip 210 and aft tip 216 is about 50 millimeters to about 150 millimeters. In some embodiments, forward sail 202 comprises a greater height than aft sail 204. In some embodiments, a vertical distance between forward tip 210 and aft tip 216 is about 350 millimeters to about 450 millimeters. In some embodiments, a lateral distance between tips 210, 216 is about 25% of a vertical distance between tips 210, 216. It should be noted that these dimensions are provided for example purposes and that one of skill in the art will appreciate that the separation of forward tip 210 and aft tip 216 and various other geometric characteristics may change for various use cases of winglet 200. For example, if blocking light incidence from lights is an important design characteristic for a winglet 200, the positioning of sails 202, 204 may be adjusted accordingly. Such changes may result in reduced aerodynamic performance; however, because of the staggered installation of sails 202, 204 that allows forward sail 202 to block light, the aerodynamic performance of winglet 200 may still be improved relative to traditional single sail arrangements while having the added benefit of improved aircraft safety.

As previously described, the root chord lines of forward sail 202 and aft sail 204 may partially overlap, and aft sail 204 may at least partially emanate from forward sail 202. In other embodiments, there may be no overlap between forward sail 202 and aft sail 204 such that the root chord line of forward sail 202 is adjacent to the root chord line of aft sail 204. In some such embodiments, a gap between the root chord line of forward sail 202 and the root chord line of aft sail 204 is present along tip chord 112. Furthermore, the sweep angle and/or cant angles of sails 202, 204 may diverge and be selected to tailor the aerodynamic benefits from the tandem sail arrangement. Sails 202, 204 may be positioned to increase air circulation at tips 210, 216 thereby leading to a reduction in induced drag. Consequently, due to the offset of sails 202, 204 in a direction parallel to freestream air flow, an improved lift-to-drag ratio and, therefore, an increased maximum lift capacity, may be realized for the aircraft. The aerodynamic improvements from the staggered offset of forward sails 102, 202 and aft sails 104, 204 may be additive to aerodynamic improvements from the increase in span loading and increased lifting area provided by winglets 100, 200.

Figure 2G:
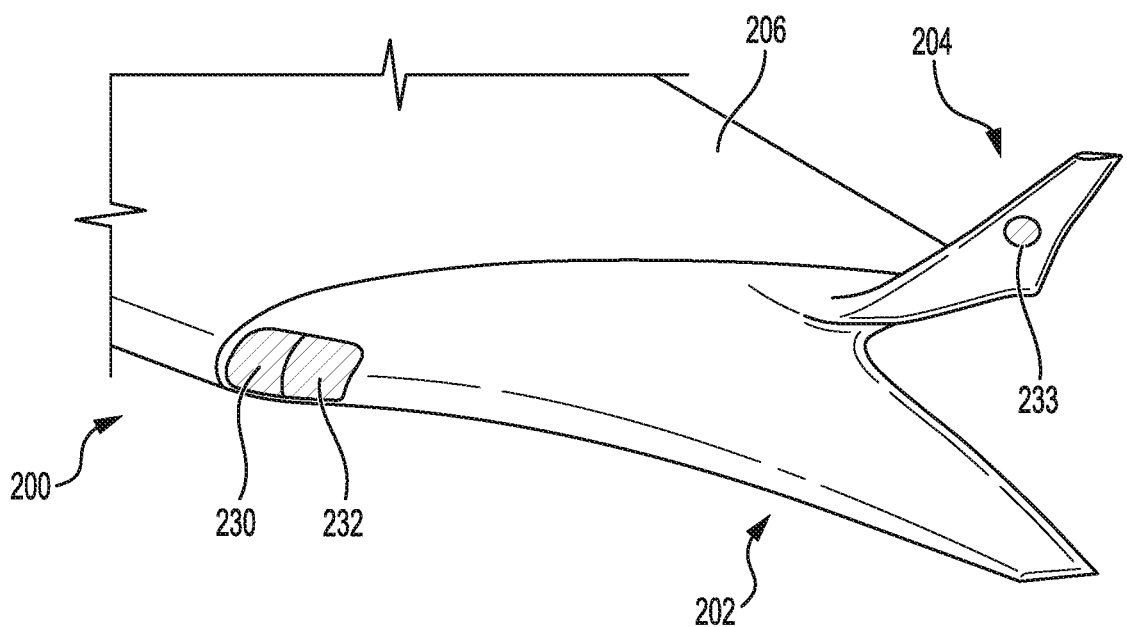
FIG. 2G illustrates an inboard-looking view of the second winglet having integrated lights, in an embodiment.

FIG. 2G illustrates an inboard-looking view of winglet 200 having a first forward sail leading edge light 230 and a second forward sail leading edge light 232 integrated along a leading edge of forward sail 102. Lights 230, 232 are examples of lights 130, 132 of FIG. 1G. Specifically, lights 230, 232 are integrated within the forward sail leading edge 114 such that their outer profile is in line with a profile of forward sail leading edge 114 and the outer lens of lights 130, 132 matches a curvature of forward sail leading edge 114. Based on the sweep of forward sail 202 and wing 206, lights 230, 232 are angled away from a cockpit window of the aircraft to avoid distracting the flight crew.

An aft sail outboard light 233 is disposed on an outboard (underside) surface of aft sail 204 without extending to the leading edge or trailing edge. In a high-wing aircraft, the pilot will sit in the cockpit at a location that is forward and below wing 206. With wing 206 being a high-wing extending from an upper portion of the aircraft fuselage, and by staggering sails 202, 204 with forward sail 202 positioned forward of aft sail 204 and with forward sail 202 being canted downwards and aft sail 204 being canted upwards, forward sail 202 has a geometry and orientation that provides a lighting barrier between light 233 and the aircraft cockpit window. Thus, by providing winglet 200 with a forward sail 202 that is curved opposite of aft sail 204, forward sail 202 may be disposed between the lights and the pilot such that forward sail 202 substantially blocks emitted light from reaching the pilot.

In some embodiments (not shown), light 233 illuminates through both the upper and lower surface of aft sail 104. Since the upper surface of aft sail 104 when installed on a high wing faces away from the aircraft cockpit, light emanating from the upper surface side of light 233 does not interfere with the crew via the cockpit window.

Figure 2H:
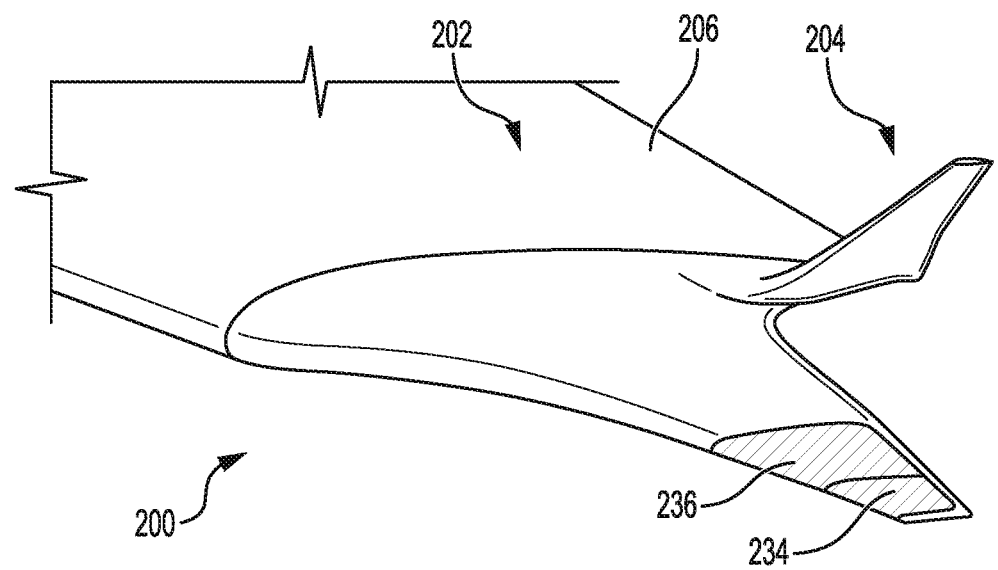
FIG. 2H illustrates an inboard-looking view of the second winglet having integrated lights, in another embodiment.

FIG. 2H illustrates an inboard-looking view of winglet 200 having integrated lights having a first underside forward sail tip light 234 and a second underside forward sail tip light 236 integrated within an outboard facing portion of forward sail 202. Lights 234, 236 are examples of lights 134, 136 of FIG. 1H. In embodiments, lights 234, 236 cover forward sail leading edge 207 and extend to forward sail trailing edge 208 on an outboard facing surface (i.e., a top side of forward sail 202). As depicted in FIG. 2H, light 236 may be disposed substantially close to forward tip 210 and light 234 may be disposed immediately inboard of light 236. By being located on the outboard facing top side of forward sail 102, due to the cant angle and aft sweep of forward sail 202, lights 234, 236 face substantially away from the aircraft cockpit window to avoid distracting the flight crew.

Figure 2I:
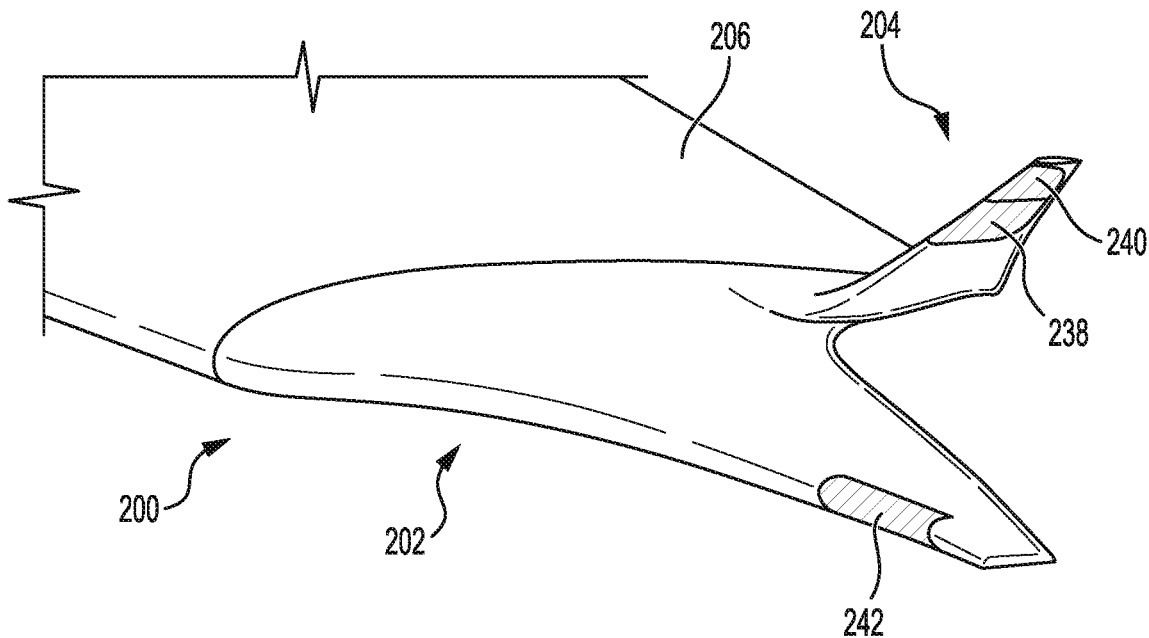
FIG. 2I illustrates an inboard-looking view of the second winglet having integrated lights, in yet another embodiment.

FIG. 2I illustrates an inboard-looking view of winglet 200 having a first aft sail outboard light 238, a second aft sail outboard light 240, and a forward sail leading edge light 242. Lights 238, 240, 242 are examples of lights 138, 140, 142 of FIG. 1I. Lights 238, 240 are disposed on an outboard (underside) of aft sail 204. With wing 206 being a high-wing extending from an upper portion of an aircraft fuselage, by staggering sails 202, 204, with forward sail 202 positioned forward of aft sail 204, and with forward sail 202 being canted downwards and aft sail 204 being canted upwards, forward sail 202 has a geometry and orientation that provides a lighting barrier between lights 238, 240 and the aircraft cockpit window. Light 242 is integrated within forward sail leading edge 207 such that the aft sweep and upwards cant angle of forward sail 202 causes the emitted light to emanate away from the aircraft cockpit window.

Figure 2J:
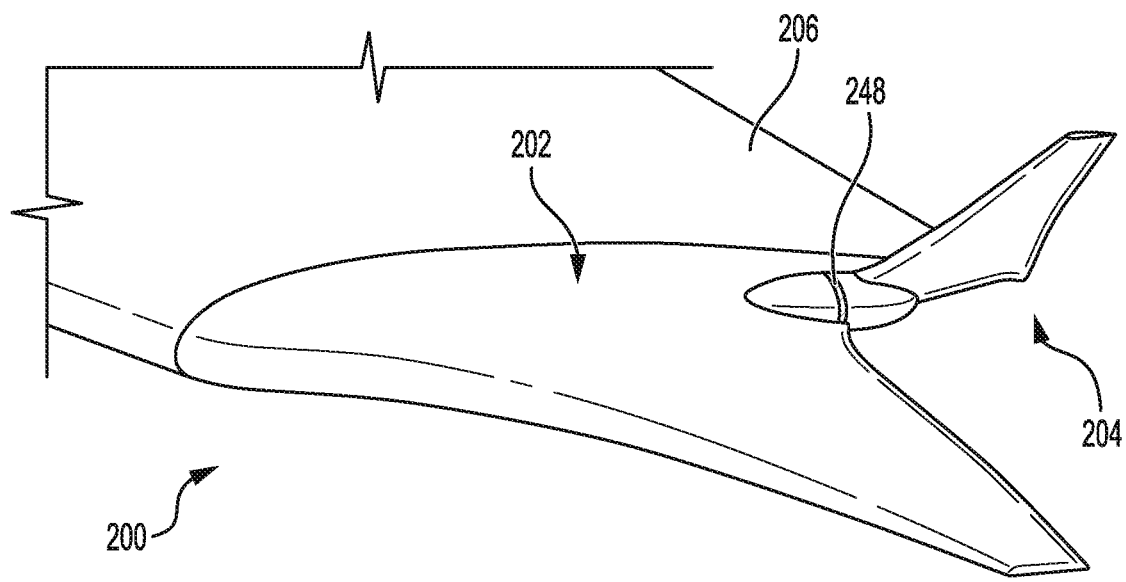
FIG. 2J illustrates an inboard-looking view of the second winglet having integrated lights, in still another embodiment.

FIG. 2J illustrates an inboard-looking view of winglet 200 having a fairing light 248. Fairing light 248 is an example of fairing light 148 of FIG. 1J. Fairing light 248 is integrated within a fairing along an intersection of forward sail 202 and aft sail 204. In embodiments, fairing light 248 wraps around a portion of the fairing. The fairing is located on a top side of forward sail 102 facing outboard such that light emanating from fairing light 248 is shielded by forward sail 202 from shining directly at the aircraft cockpit window.

While winglets 100, 200 are depicted with an aft sweep, it should be noted that winglets 100, 200 may be swept forwards without departing from the scope of the invention. A forward-swept forward sail 102, 202 may comprise a sweep angle distinct from that of a forward-swept aft sail 104, 204. As previously discussed, the distinct sweep angles may allow for winglets 100, 200 to be tailored such that the interaction between the wake of a forward sail 102, 202 has a positive interaction on the aft sail 104, 204. This interaction between forward sails 102, 202 and aft sails 104, 204 may improve the lift-to-drag ratio of wing 106/206 such that the induced drag is reduced.

Embodiments are contemplated wherein winglets 100, 200 are used on other wing-borne flight vehicles besides aircraft. For example, winglets 100, 200 may be added to drones to increase the aerodynamic performance thereof. Similarly, other wing-like components, such as aerodynamic stabilizing surfaces, may see an aerodynamic benefit and a drag reduction from winglets 100, 200.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A tandem split divergent winglet for an aircraft, comprising:
   a forward sail having a leading edge that extends outboard and upwards from a leading edge of a wing of the aircraft and the leading edge curves aft directly from the wing leading edge with a smaller radius of curvature near an outboard end of the wing and an increasing radius of curvature to a tip of the forward sail,
      wherein the wing is a low wing extending from a lower portion of a fuselage of the aircraft, and
      wherein the forward sail comprises a positive cant angle with a continuous concave curvature facing the fuselage;
   an aft sail having a trailing edge that extends linearly outboard from a trailing edge of the wing before curving aft and extending downwards beneath the wing,
      wherein the aft sail comprises a negative cant angle such that an outboard portion of the aft sail substantially faces the fuselage;
   an overlap region in which a leading edge of the aft sail partially extends from a bottom surface of the forward sail; and
   an integrated light formed within the aft sail, wherein the forward sail comprises a geometry and an orientation configured to block light emitted from the integrated light from reaching a cockpit window of the aircraft;
      wherein the integrated light extends from a leading edge of the aft sail to a trailing edge of the aft sail on an outboard side.

2. The tandem split divergent winglet of claim 1, wherein the integrated light comprises an outer lens having a profile that is in line with a profile of the aft sail and that matches a shape of the aft sail.

3. The tandem split divergent winglet of claim 1, wherein the integrated light is disposed on an outboard-facing side of the aft sail such that emitted light shines away from the fuselage.

4. The tandem split divergent winglet of claim 1, wherein the integrated light is located within a leading edge of the aft sail.

5. The tandem split divergent winglet of claim 1, wherein the integrated light illuminates through both an upper surface and a lower surface of the aft sail without extending to a leading edge or a trailing edge of the aft sail.

6. A tandem split divergent winglet for an aircraft, comprising:
a forward sail having a leading edge that extends outboard and upwards from a leading edge of a wing of the aircraft, and the leading edge curves aft directly from the wing leading edge with a smaller radius of curvature near an outboard end of the wing and an increasing radius of curvature to a tip of the forward sail,
wherein the forward sail is canted in a first direction with respect to the wing, and
wherein the forward sail comprises a continuous concave curvature facing a fuselage of the aircraft;
an aft sail having a trailing edge that extends linearly outboard from a trailing edge of the wing before curving aft and extending partially from the forward sail and partially from the outboard end of the wing,
wherein the aft sail is canted in a second direction opposite from the first direction, and
wherein the aft sail comprises a continuous concave curvature facing the fuselage; and
an integrated light formed within the aft sail, wherein the forward sail is configured to shield a cockpit window of the aircraft from light emanating from the integrated light; wherein the integrated light illuminates through both an upper surface and a lower surface of the aft sail without extending to a leading edge or a trailing edge of the aft sail.

7. The tandem split divergent winglet of claim 6, wherein the wing is a low-wing extending from a lower portion of a fuselage of the aircraft, and wherein the first direction is upwards and the second direction is downwards with respect to the wing.

8. The tandem split divergent winglet of claim 6, wherein the integrated light is disposed on an outboard-facing side of the aft sail such that emitted light shines away from the fuselage.

9. The tandem split divergent winglet of claim 6, comprising an integrated light formed within the forward sail, wherein the integrated light is disposed on an outboard-facing side of the forward sail such that emitted light shines away from the fuselage.

* * * * *